(12) United States Patent
Otomo

(10) Patent No.: US 9,757,657 B2
(45) Date of Patent: Sep. 12, 2017

(54) INFORMATION PROCESSING DEVICE AND GAME PROGRAM FOR CONFIGURING VIDEO GAME SUPPORT CHARACTERS

(71) Applicant: DeNA Co., Ltd., Tokyo (JP)

(72) Inventor: Takahiro Otomo, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 168 days.

(21) Appl. No.: 14/741,288

(22) Filed: Jun. 16, 2015

(65) Prior Publication Data
US 2015/0367240 A1 Dec. 24, 2015

(30) Foreign Application Priority Data
Jun. 18, 2014 (JP) .................................. 2014-125215

(51) Int. Cl.
*A63F 9/24* (2006.01)
*A63F 13/822* (2014.01)
(Continued)

(52) U.S. Cl.
CPC .......... *A63F 13/822* (2014.09); *A63F 13/795* (2014.09); *A63F 13/847* (2014.09); *G06F 3/048* (2013.01)

(58) Field of Classification Search
CPC . A63F 13/822; A63F 13/795; A63F 2300/556
See application file for complete search history.

(56) References Cited

U.S. PATENT DOCUMENTS

2008/0227543 A1* 9/2008 Kawase .................. A63F 13/10
463/31
2012/0015744 A1* 1/2012 Mooney ................ A63F 13/822
463/42
(Continued)

FOREIGN PATENT DOCUMENTS

JP 2008-73264 A 4/2008
JP 2013-81760 A 5/2013
JP 2013-138730 A 7/2013

OTHER PUBLICATIONS

Japanese Patent Application No. 2014-125215:Office Action mailed on Feb. 3, 2015.
(Continued)

*Primary Examiner* — Steve Rowland
(74) *Attorney, Agent, or Firm* — Procopio, Cory, Hargreaves & Savitch LLP

(57) ABSTRACT

The information processing device relating to the present invention configures, in association with a stage where each of a plurality of players can engage in battle play, a player character owned by the player as a support character that provides support in a stage where another player engages in battle play, generates a game screen displaying a list view of support characters associated with the selected stage once a first player among the plurality of players performs an operation to select a stage, directs the selected support character and a player character belonging to the first player to engage in battle with an enemy character configured in the selected stage once the first player performs an operation to select a support character from the list, and provides benefits to a second player, from among the plurality of players, who owns the selected support character.

6 Claims, 12 Drawing Sheets

(51) Int. Cl.
    *A63F 13/795*     (2014.01)
    *G06F 3/048*     (2013.01)
    *A63F 13/847*     (2014.01)

(56) References Cited

U.S. PATENT DOCUMENTS

2012/0094765 A1*   4/2012   Reynolds ................ A63F 13/12
    463/42
2012/0302351 A1*   11/2012   Murphy ................ A63F 13/12
    463/42

OTHER PUBLICATIONS

Japanese Patent Application No. 2014-125215:Rejection Assessment mailed on May 12, 2015.
"Oto-Ranger", "Apuri Fan, December Issue", Cosmic Publications, Dec. 10, 2013, vol. 1, No. 6, pp. 22-23.

* cited by examiner

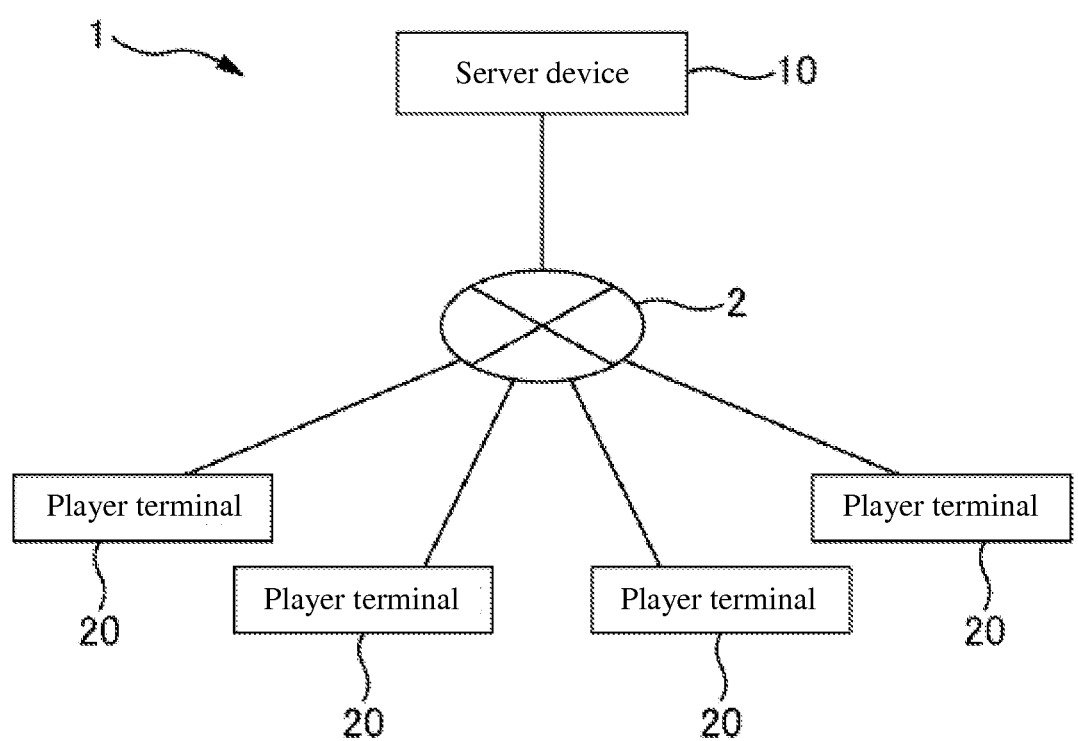
[FIG. 1]

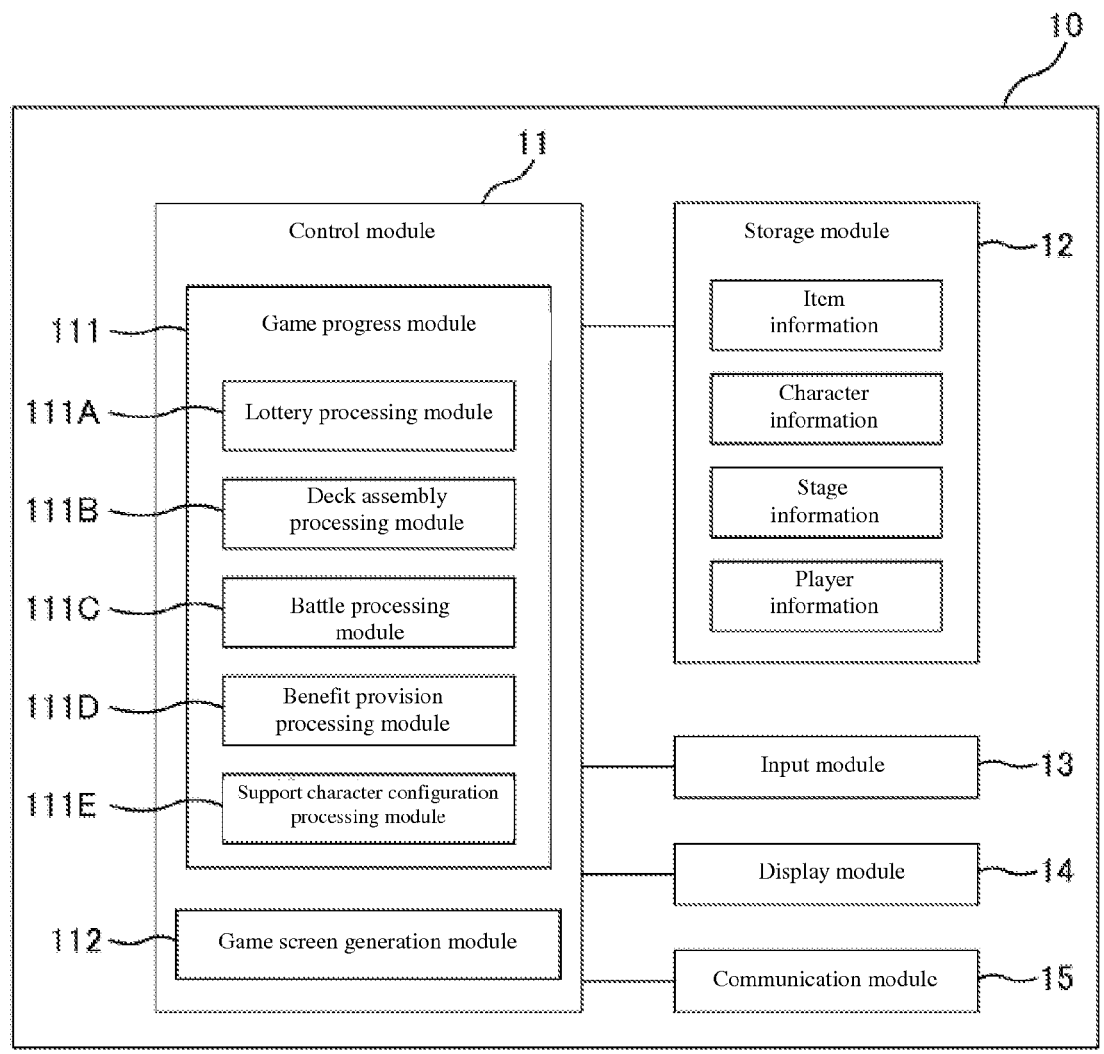
[FIG. 2]

| Item ID | Item Name | Price |
|---------|-----------|-------|
| 0001    | Item A    | 100   |
| 0002    | Item B    | 200   |
| 0003    | Item C    | 300   |
| ⋮       | ⋮         | ⋮     |

[FIG. 3]

| Character ID | Character Name | Character Image | Rarity | Initial Attack Strength | Initial Defense Strength |
|--------------|----------------|-----------------|--------|-------------------------|--------------------------|
| 0001 | Character A | 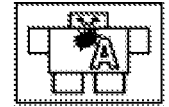 | Common | 15 | 8 |
| 0002 | Character B |  | Uncommon | 30 | 20 |
| 0003 | Character C | 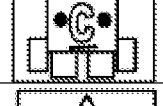 | Rare | 45 | 30 |
| 0004 | Character D | 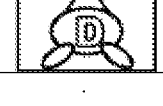 | Super-rare | 60 | 55 |
| ⋮ | ⋮ | ⋮ | ⋮ | ⋮ | ⋮ |

| Initial Hit Points | Upper Attack Strength Limit | Upper Defense Strength Limit | Upper Hit Points Limit | Item ID | Drop rate | Attribute Information |
|--------------------|-----------------------------|------------------------------|------------------------|---------|-----------|-----------------------|
| 10 | 100  | 100  | 100  | 0001 | 40 | Attribute A |
| 15 | 300  | 300  | 300  | 0005 | 30 | Attribute B |
| 25 | 600  | 600  | 600  | 0020 | 20 | Attribute C |
| 60 | 1000 | 1000 | 1000 | 0045 | 10 | Attribute A |
| ⋮  | ⋮    | ⋮    | ⋮    |      |    |             |

[FIG. 4]

| Stage ID | Stage Name | Attribute Information | Appearing Character | |
|---|---|---|---|---|
| | | | Character ID | Rate of Appearance |
| 001 | Stage 1 | Attribute A | 0001 | 100% |
| 002 | Stage 2 | Attribute B | 0002 | 100% |
| 003 | Stage 3 | Attribute C | 0001 | 80% |
| | | | 0003 | 100% |
| 004 | Stage 4 | Attribute A | 0002 | 80% |
| | | | 0003 | 60% |
| | | | 0004 | 100% |
| 005 | Stage 5 | Attribute B | 0002 | 80% |
| | | | 0004 | 60% |
| | | | 0005 | 100% |
| . | . | . | . | . |
| . | . | . | . | . |
| . | . | . | . | . |

[FIG. 5]

| Player ID | Player Name | Level | Friend Player's Player ID | Friend Points | Proprietary Character Information |
|---|---|---|---|---|---|
| 1 | Player A | 10 | 5,8 | 100 | Proprietary Character Information (1) |
| 2 | Player B | 6 | - | 200 | Proprietary Character Information (2) |
| 3 | Player C | 8 | 4,6 | 300 | Proprietary Character Information (3) |
| 4 | Player D | 12 | 15,30 | 50 | Proprietary Character Information (4) |
| 5 | Player E | 26 | 3,6,18,20 | 1200 | Proprietary Character Information (5) |
| 6 | Player F | 50 | 2,5,9,12… | 400 | Proprietary Character Information (6) |
| . | . | . | . | . | . |
| . | . | . | . | . | . |
| . | . | . | . | . | . |

| Proprietary Item Information | Team Information | Support Character Information | Cleared Stages Information |
|---|---|---|---|
| Proprietary Item Information (1) | Team Information (1) | Support Character Information (1) | Cleared Stages Information (1) |
| Proprietary Item Information (2) | Team Information (2) | Support Character Information (2) | Cleared Stages Information (2) |
| Proprietary Item Information (3) | Team Information (3) | Support Character Information (3) | Cleared Stages Information (3) |
| Proprietary Item Information (4) | Team Information (4) | Support Character Information (4) | Cleared Stages Information (4) |
| Proprietary Item Information (5) | Team Information (5) | Support Character Information (5) | Cleared Stages Information (5) |
| Proprietary Item Information (6) | Team Information (6) | Support Character Information (6) | Cleared Stages Information (6) |
| . | . | . | . |
| . | . | . | . |

[FIG. 6]

| Proprietary Character Information (3) | | | | | | | |
| Proprietary Character Information (2) | | | | | | | 0:00 |
| Proprietary Character Information (1) | | | | | | 0:00 | 2:00 |
| Character ID | Level | Attack Strength | Defense Strength | Hit Points | Date Acquired | 2:00 | 1:30 |
|---|---|---|---|---|---|---|---|
| 0011 | LV. 3 | 15 | 10 | 200 | Feb. 13, 2012 10:00 | 2:00 | 1:30 |
| 0211 | LV. 4 | 20 | 23 | 150 | Feb. 13, 2012 12:00 | 1:30 | 8:00 |
| 0133 | LV. 1 | 70 | 45 | 100 | Feb. 14, 2012 11:30 | 8:00 | 3:30 |
| 0201 | LV. 4 | 22 | 40 | 600 | Feb. 15, 2012 18:00 | 3:30 | 9:00 |
| 0072 | LV. 7 | 60 | 50 | 250 | Feb. 16, 2012 13:30 | 9:00 | |
| 0094 | LV. 1 | 300 | 200 | 450 | Feb. 16, 2012 19:00 | | |
| . | . | . | . | . | . | | |
| . | . | . | . | . | | | |
| . | . | . | . | . | | | |

[FIG. 7]

| Proprietary Item Information (3) | |
|---|---|
| Proprietary Item Information (2) | |
| Proprietary Item Information (1) | |
| Item ID | Number of Items Owned |
| 0001 | 20 |
| 0002 | 10 |
| 0003 | 1 |
| ⋮ | ⋮ |

[FIG. 8]

| Team Information (3) | | | |
|---|---|---|---|
| Team Information (2) | | | |
| Team Information (1) | | | |
| Team ID | Team Name | Constituting Characters (Character ID) | Leader |
| 001 | Team A | 0001 | O |
| | | 0005 | - |
| | | 0010 | - |
| | | 0027 | - |
| | | 0102 | - |
| ⋮ | ⋮ | ⋮ | ⋮ |

[FIG.9]

| Support Character Information (3) | |
|---|---|
| Support Character Information (2) | |
| Support Character Information (1) | |
| Stage ID | Support Character (Character ID) |
| 0001 | 0060 |
| 0002 | 0103 |
| 0003 | 0007 |
| 0004 | - |
| 0005 | - |
| ⋮ | ⋮ |

[FIG. 10]

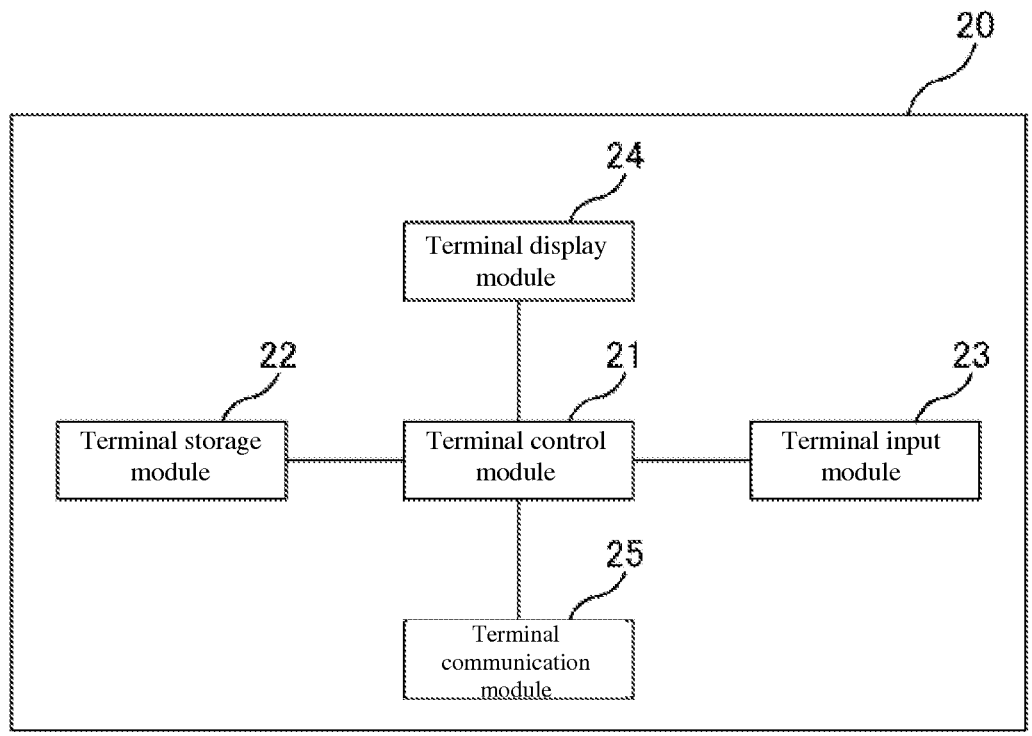
| Cleared Stages Information (1) ||
| Stage ID | Flag |
| 0001 | TRUE |
| 0002 | TRUE |
| 0003 | TRUE |
| 0004 | FALSE |
| 0005 | - |
| ⋮ | ⋮ |
(Cleared Stages Information (2), Cleared Stages Information (3) layered behind)
[FIG.11]
[FIG.12]

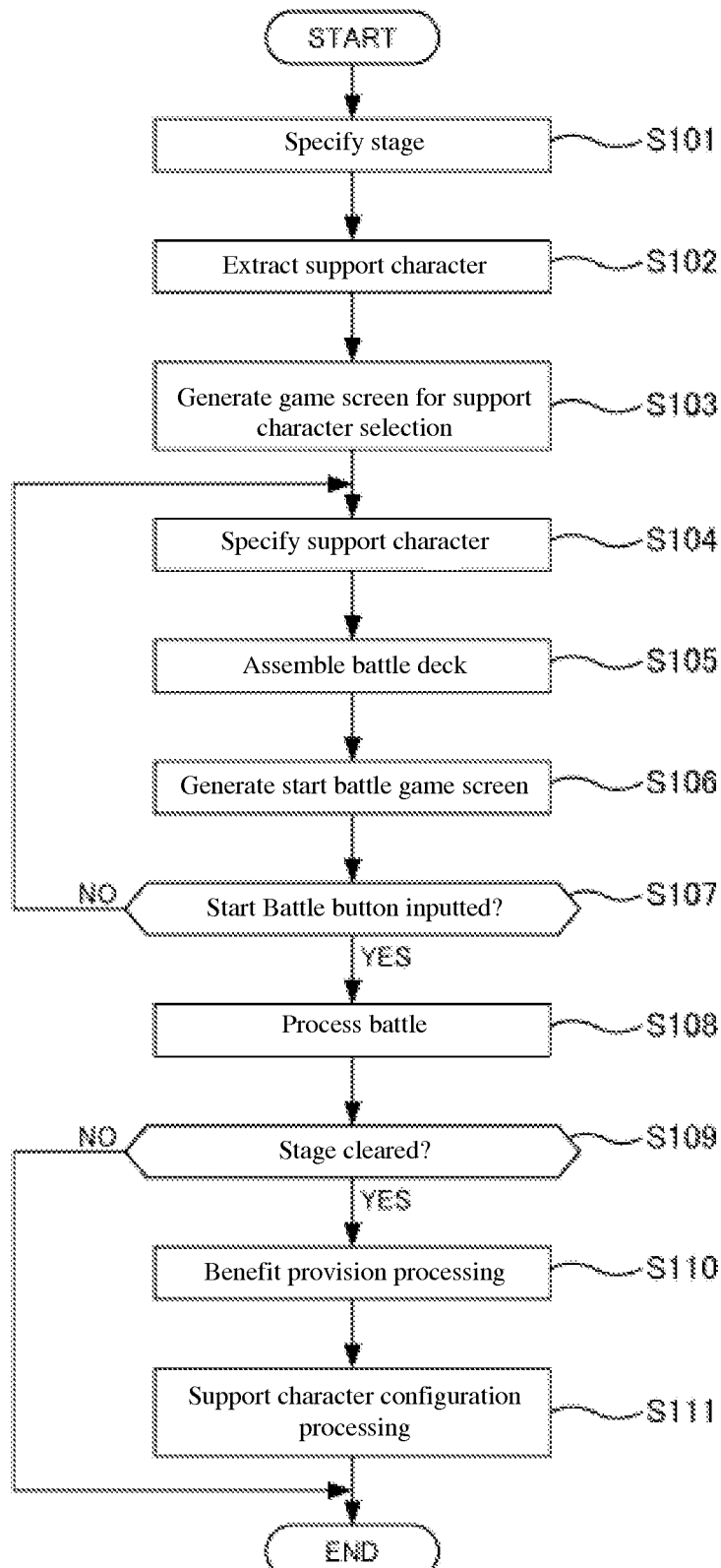
[FIG. 13]

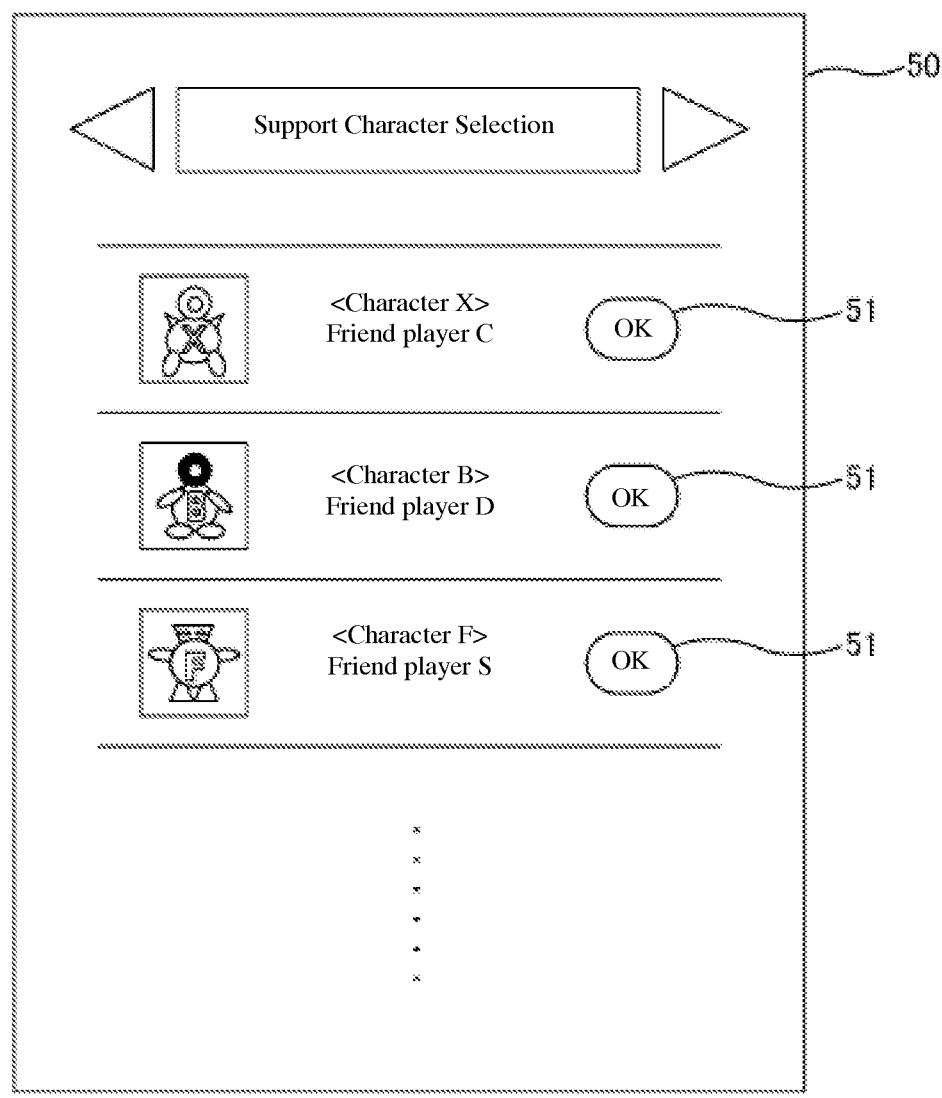
[FIG.14]

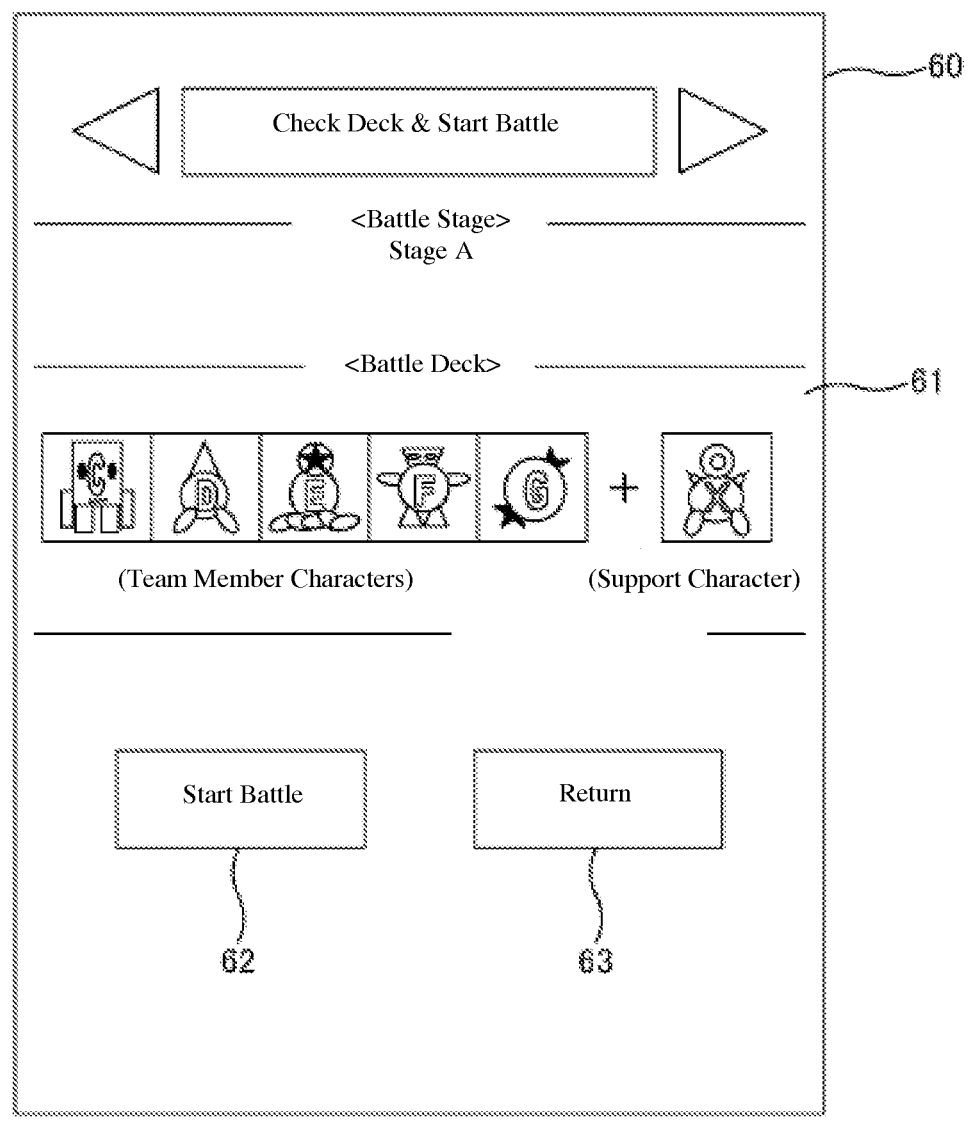
[FIG. 15]

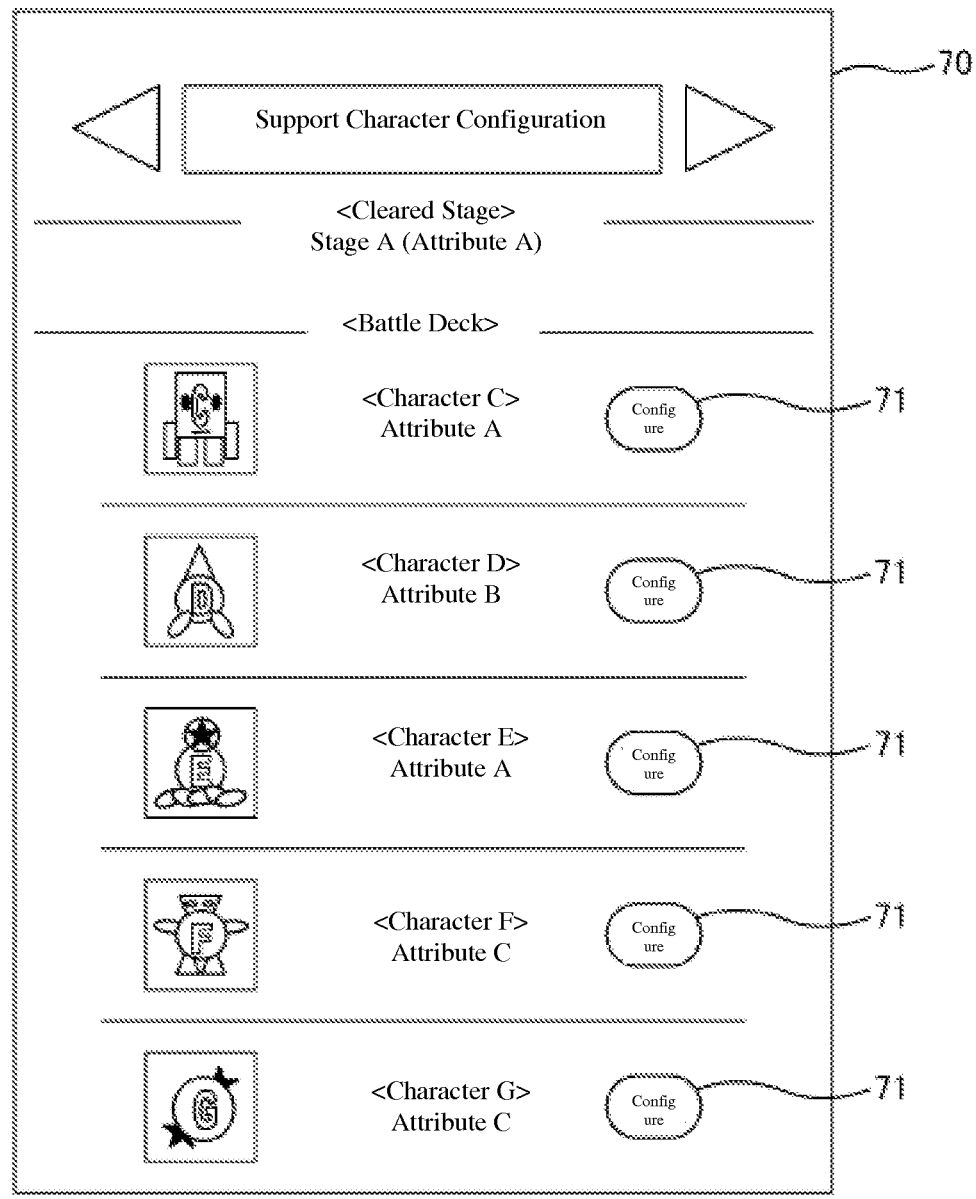
[FIG. 16]

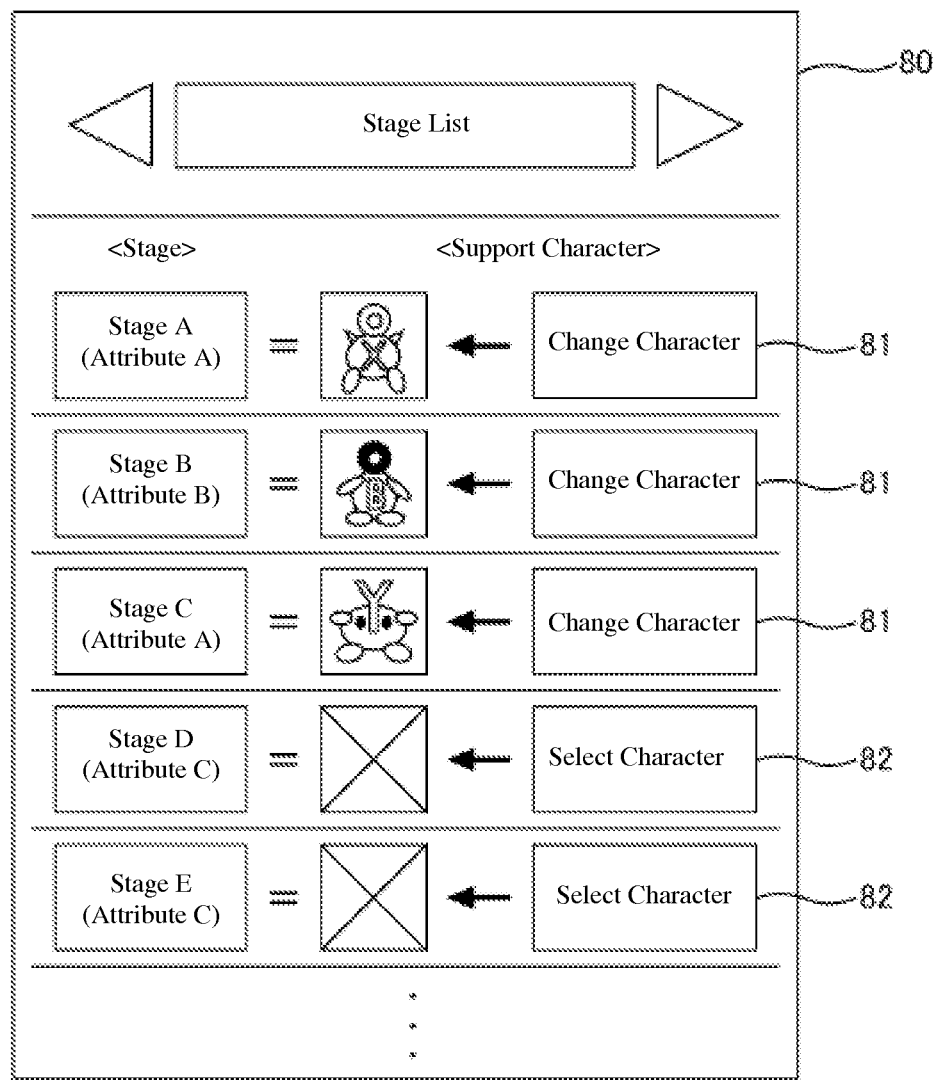
[FIG. 17]

INFORMATION PROCESSING DEVICE AND GAME PROGRAM FOR CONFIGURING VIDEO GAME SUPPORT CHARACTERS

The present application claims the benefit of Japanese Patent Application No. JP2014-125215, filed on Jun. 18, 2014, the contents of which is incorporated herein in its entirety by reference.

BACKGROUND

Technical Field

The present invention relates to an information processing device and a game program (e.g., a non-transitory computer readable medium having machine-executable instructions and including a computer having a storage and a hardware processor).

Background Art

Game systems are known in which a player character belonging to a player is configured as a support character acting as an "assistant" and, when a player character belonging to a different player is directed to engage in battle with an enemy character acting as an opponent, this support character is directed to take part in the battle (for example, see Patent Citation 1).

PRIOR ART DOCUMENTS

Patent Document

Patent Document 1: Japanese Patent Application Publication No. 2013-138730

SUMMARY

In such game systems, since support characters are configured in a uniform fashion, it has not been always possible to use stage-appropriate support characters in battles in situations in which the battles with enemy characters take place over multiple stages.

The present invention has been devised with such circumstances in mind and it is an object of the invention to ensure that it is possible to configure a stage-appropriate support character.

The primary invention of the present invention for solving the above-described problems is an information processing device, wherein said device is provided with a support character configuration processing module that configures, in association with a stage where each of a plurality of players can engage in battle play, a player character selected by each of the players from a plurality of characters owned by the players themselves as a support character that provides support in a stage where another player engages in battle play;

a game screen generation module which, once a first player among the plurality of players performs an operation to select a stage for battle play, generates a game screen displaying a list view of support characters associated with the selected stage;

a battle processing module which, once the first player performs an operation to select a particular support character from the list, directs the selected support character and a player character belonging to the first player to engage in battle with an enemy character configured in the selected stage; and a benefit provision processing module that provides benefits to a second player, from among the plurality of players, who owns the selected support character.

Other features of the present invention will become apparent from this Description and the accompanying drawings.

BRIEF DESCRIPTION OF THE DRAWINGS

FIG. 1
A diagram illustrating an example configuration of the entire game system 1.
FIG. 2
A block diagram illustrating the functional configuration of the server device 10.
FIG. 3
A diagram illustrating an example data structure of item information.
FIG. 4
A diagram illustrating an example data structure of character information.
FIG. 5
A diagram illustrating an example data structure of stage information.
FIG. 6
A diagram illustrating an example data structure of player information.
FIG. 7
A diagram illustrating an example data structure of proprietary character information.
FIG. 8
A diagram illustrating an example data structure of proprietary item information.
FIG. 9
A diagram illustrating an example data structure of team information.
FIG. 10
A diagram illustrating an example data structure of support character information.
FIG. 11
A diagram illustrating an example data structure of cleared stages information.
FIG. 12
A block diagram illustrating the functional configuration of the player terminal 20.
FIG. 13
A flow chart used to illustrate an example of operation of the game system 1.
FIG. 14
A diagram illustrating an example of the game screen 50 for selecting support characters.
FIG. 15
A diagram illustrating an example of a start battle game screen 60.
FIG. 16
A diagram illustrating an example of a game screen 70 used for support character configuration.
FIG. 17
A diagram illustrating an example of a game screen 80 used for support character configuration.

DETAILED DESCRIPTION

At least the following will become apparent from this Description and the accompanying drawings.

Specifically, this is an information processing device provided with a support character configuration processing module that configures, in association with a stage where each of multiple players can engage in battle play, a player character selected by each of the players from multiple characters owned by the players themselves as a support character that provides support in a stage where another player engages in battle play;

a game screen generation module which, once a first player among the multiple players performs an operation to select a stage for battle play, generates a game screen displaying a list view of support characters associated with the selected stage;

a battle processing module which, once the first player performs an operation to select a particular support character from the list, directs the selected support character and a player character belonging to the first player to engage in battle with an enemy character configured in the selected stage; and a benefit provision processing module that provides benefits to a second player, from among the plurality of players, who owns the selected support character.

Such an information processing device makes it possible for each of the multiple players to configure stage-appropriate support characters. For this reason, it becomes easy for the first player to select a stage-appropriate support character from the list and gain an advantage in battle with enemy characters in that stage. In addition, it becomes easy for the second player to acquire more benefits because a support character that is likely to be selected by the first player can be configured for each stage.

In addition, in such an information processing device, the support character configuration processing module may be adapted to configure a player character belonging to the first player as a support character associated with the selected stage after the first player completes battle play in the selected stage.

In such an information processing device, when the first player among the plurality of players configures a support character, a support character associated with that stage may be selected subsequent to experiencing actual battle play in the stage, thereby enabling configuration of a more stage-appropriate support character.

In addition, in such an information processing device, the support character configuration processing module may be adapted to configure the player character that is directed to engage in battle with the enemy character in the selected stage, from among the multiple characters owned by the first player, as a support character associated with said stage.

Furthermore, in such an information processing device, a player character that contributes to the battle with the enemy character configured for a particular stage may be selected as a support character associated with that stage, thereby enabling configuration of a more stage-appropriate support character.

Furthermore, in such an information processing device, the support character configuration processing module configures, in association with a stage where each of the plurality of players can engage in battle play, the support characters that correspond to each of the other players engaged in battle play in the above-mentioned stage.

Such an information processing device makes it possible to configure support characters that correspond to other players.

Further, this is a game program (e.g., a non-transitory computer readable medium having machine-executable instructions and including a computer having a storage and a hardware processor) that directs a computer to perform:

a support character configuration process that configures, in association with a stage where each of a plurality of players can engage in battle play, a player character selected by each of the players from a plurality of characters owned by the players themselves as a support character that provides support in a stage where another player engages in battle play;

a game screen generation process which, once a first player among the plurality of players performs an operation to select a stage for battle play, generates a game screen displaying a list view of support characters associated with the selected stage;

a battle process which, once the first player performs an operation to select a particular support character from the list, directs the selected support character and a player character belonging to the first player to engage in battle with the enemy character configured in the selected stage; and a benefit provision process that provides benefits to a second player, from among the plurality of players, who owns the selected support character.

Such game program makes it possible for each of the multiple players to configure stage-appropriate support characters.

Embodiment

<<Configuration of Game System 1>>

FIG. 1 is a diagram illustrating an example configuration of the entire game system 1. The game system 1 provides various game-related services to the player over a network 2 (for example, the Internet) and includes a server device 10 and multiple player terminals 20.

The game system 1 according to the present embodiment can offer players a battle game conducted using game media. The description below will discuss a battle-type card game conducted using character cards (hereinafter referred to simply as "characters"), which are an example of game media.

The battle-type card game of the present embodiment is a battle game in which player characters belonging to players are directed to engage in battle with enemy characters configured for each stage. In this battle game, player characters belonging to other players can be directed to participate as support characters in battles with enemy characters.

In the present embodiment, player characters respectively selected by the players from the multiple characters owned by the players themselves are configured as support characters respectively for each stage. When a player (a first player) selects a stage for battle play from multiple stages, a list view of the support characters (in other words, player characters owned by other players (by a second player)) configured in the selected stage is displayed on the game screen. Subsequently, when said player selects a stage-appropriate support character from the list, a battle deck is assembled. This is made up of the selected support character and player characters owned by the player. The player can use this battle deck to engage in battle play in the selected stage and gain an advantage in the battle game in cooperation with the support character acting as an assistant. At such time, friend points are awarded as benefits to the other player who owns the support character selected by said player.

<<Configuration of Server Device 10>>

FIG. 2 is a block diagram illustrating the functional configuration of the server device 10. The server device 10 is an information processing device (e.g., a workstation, a personal computer, etc.) used by a system administrator to operate and manage various services. Upon receiving various commands (requests) from the player terminals 20, the server device 10 transmits (responds by sending) game programs (e.g., non-transitory computer readable medium having machine-executable instructions and including a computer having a storage and a hardware processor) that are operational on the player terminals 20, as well as various types of data and web pages (game screens, etc.) created using a markup language (HTML, etc.) compliant with the specifications of the player terminals 20. The server device 10 has a control module 11, a storage module 12, an input module 13, a display module 14, and a communication module 15.

The control module 11, along with transferring data between the components, exercises overall control over the server device 10, and is implemented using a CPU (Central Processing Unit) that runs a predetermined program stored in memory (e.g., a non-transitory computer readable medium having machine-executable instructions and including a computer having a storage and a hardware processor). The control module 11 of present embodiment is provided with at least a game progress module 111 and a game screen generation module 112.

The game progress module 111 possesses functionality to carry out processing for directing the game to proceed in accordance with the game program. This game progress module 111 is provided with at least a lottery processing module 111A, a deck assembly processing module 111B, a battle processing module 111C, a benefit provision processing module 111D, and a support character configuration processing module 111E.

The lottery processing module 111A possesses functionality to carry out various types of lottery game-related processing. Upon receiving operation input from the player, the lottery processing module 111A of the present embodiment spends the friend points belonging to the player, awards a character randomly selected from multiple characters, and updates the player's proprietary character information. The player can use the character awarded by a drawing to compose a battle deck used for battles with enemy characters.

The deck assembly processing module 111B has the functionality to carry out processing required to assemble a deck composed of multiple characters. A "deck" is a group of characters produced by combining multiple characters into a single set. The deck assembly processing module 111B of the present embodiment, which has multiple teams made up of multiple player characters pre-registered in the player's team information, assembles a battle deck by adding a support character owned by another player into a particular team selected from these multiple teams. The player can use this battle deck during battle play in the stage.

The battle processing module 111C possesses functionality to carry out various types of battle game-related processing. The battle processing module 111C of the present embodiment directs the player characters and the support character constituting the battle deck to engage in battle with the enemy characters configured in the stage.

The benefit provision processing module 111D possesses functionality to carry out processing for providing benefits to the player. The benefit provision processing module 111D of the present embodiment awards friend points as benefits as an example to the player who owns a support character which has been selected by another player.

The support character configuration processing module 111E possesses the functionality to carry out processing required to configure support characters for each stage. The support character configuration processing module 111E of the present embodiment configures, in association with a stage where each of the multiple players can engage in battle play, a player character, which is selected by each of the multiple players from the multiple characters owned by the players themselves, as a support character.

The game screen generation module 112 possesses functionality to carry out processing used to generate screen data for displaying a game screen on a player terminal 20. The game screen generation module 112 of the present embodiment generates HTML data as screen data corresponding to game screens.

The storage module 12, which has a ROM (Read Only Memory), i.e. a read-only storage area, in which operating system software is stored, and a RAM (Random Access Memory), i.e. a rewritable storage area used as a work area for arithmetic processing by the control module 11, is implemented using a flash memory, a hard disk, or another non-volatile storage device. The storage module 12 of the present embodiment stores at least item information, character information, stage information, and player information. It should be noted that each of these information elements will be described in more detail below.

The input module 13, which is used by a system administrator to enter various types of data (e.g., item information, character information, stage information, etc.), is implemented, for example, as a keyboard, a mouse, or the like.

The display module 14, which is used to display an operation screen for use by a system administrator in response to commands from the control module 11, is implemented, for example, as a liquid crystal display (LCD: Liquid Crystal Display), or the like.

The communication module 15, which is used for communication with the player terminals 20, has receiver functionality for receiving various types of data and signals transmitted from the player terminals 20 and transmitter functionality for transmitting various types of data and signals to the player terminals 20 in response to commands from the control module 11. The communication module 15 is implemented, for example, as an NIC (Network Interface Card), or the like.

FIG. 3 is a diagram illustrating an example data structure of item information. This item information has at least an item name and a price configured in conjunction with item IDs. The price represents information indicating the value of an item.

FIG. 4 is a diagram illustrating an example data structure of character information. This character information has at least a character name, a character image, rarity, an initial attack strength, an initial defense strength, initial hit points, an upper attack strength limit, an upper defense strength limit, an upper hit point limit, and other initial values and maximum values of various parameters, item IDs, drop rates, and attribute information configured in conjunction with character IDs. The item IDs represent information that indicates items belonging to a character. The drop rates represent information indicating the probabilities of a player acquiring items belonging to a character. The attribute information represents information indicating the attributes of a character.

FIG. 5 is a diagram illustrating an example data structure of stage information. This stage information has at least a stage name, attribute information, and appearing characters configured in conjunction with a stage ID. The attribute information represents information indicating the attributes of a stage. In the present embodiment, the attributes of stages and the attributes of above-described characters make use of common attribute data. The appearing characters represent information related to one or many characters appearing in the stage, with the rates of appearance configured in conjunction with the character IDs. In principle, the attributes of the appearing characters and the attributes of the stage are configured to be the same attributes (in exceptional cases, the attributes of the appearing characters and the attributes of the stage may be configured to be different attributes). The character IDs represent information indicating the type of the one or many characters appearing in the stage. The rates of appearance represent information indicating the probability of appearance of each character in the stage. It should be noted that each stage may be configured to be composed of multiple sub-stages. In such a case, one or many appearing characters are configured respectively for each sub-stage.

FIG. 6 is a diagram illustrating an example data structure of player information. This player information has at least a player name, a level, friend players' player IDs, friend points, proprietary character information, proprietary item information, team information, support character information, and cleared stages information configured therein in association with a player ID.

FIG. 7 is a diagram illustrating an example data structure of proprietary character information. The proprietary character information represents information relating to characters belonging to the players (hereinafter referred to as "proprietary characters"). This proprietary character information has configured therein, in association with the character IDs of the proprietary characters, the current values of various parameters, at least such as level, attack strength, defense strength, and hit points.

FIG. 8 is a diagram illustrating an example data structure of proprietary item information. The proprietary item information represents information relating to items belonging to a player (hereinafter referred to as "proprietary items"). This proprietary item information has at least the number of proprietary items configured therein in association with item IDs.

FIG. 9 is a diagram illustrating an example data structure of team information. The team information represents information relating to teams composed by the player. This team information has at least a team name, constituent characters, and a leader configured therein in association with a team ID. The constituent characters represent information indicating the character IDs of the player characters constituting the team. The leader represents information indicating a player character configured as the leader of the team.

FIG. 10 is a diagram illustrating an example data structure of support character information. The support character information represents information relating to support characters. This support character information has at least support characters configured therein in association with the stage IDs. The support characters contain information indicating the character IDs of the support characters associated with the stage.

FIG. 11 is a diagram illustrating an example data structure of the cleared stages information. The cleared stages information represents information indicating the history of the stages that the player has cleared so far. This cleared stages information has at least flag information configured therein in association with stage IDs. In the flag information, "TRUE" is configured in the stage IDs of the stages that have been cleared so far, and "FALSE" configured in the stage IDs of the stages that have not been cleared yet.

<<Configuration of Player Terminal 20>>

FIG. 12 is a block diagram illustrating the functional configuration of a player terminal 20.

The player terminal 20 is an information processing device owned and used by the player (for example, a tablet terminal, a mobile phone terminal, a smartphone, etc.). Thanks to the web browser functionality it possesses, the player terminal 20 is capable of on-screen display of web pages (game screens, etc.) transmitted from the server device 10. The player terminal 20 has a terminal control module 21 used for providing overall control over the player terminal 20, a terminal storage module 22 used for storing various types of data and software programs (e.g., a non-transitory computer readable medium having machine-executable instructions and including a computer having a storage and a hardware processor), a terminal control module 23 used by the player for operation input, a terminal display module 24 used for displaying game screens and operation screens, and a terminal communication module 25 used for communicating information to and from the server device 10.

<<Operation of Game System 1>>

FIG. 13 is a flow chart used to illustrate an example of operation of the game system 1. The operation of the battle game, in which the player characters and support characters constituting the battle decks of the players are engaged in battle against enemy characters that are configured in the stages, will be illustrated in specific detail below.

First of all, the player terminal 20 uses screen data transmitted from the server device 10 to display a game screen used for stage selection on the terminal display module 24, thereby allowing the player to specify a stage for battle play from among the multiple stages (Step S101). Subsequently, when the player performs an operation to select a particular stage, a command requesting transmission of a game screen (game screen transmission request) used for support character selection is transmitted by the player terminal 20 to the server device 10 based on such operational information.

Next, upon receiving the game screen transmission request transmitted from the player terminal 20, the server device 10 extracts support character candidates (Step S102). Specifically, the game screen generation module 112 refers to the player information illustrated in FIG. 6 and identifies the friend players associated with the player. Then, by referring to the support character information associated with each friend player, as illustrated in FIG. 10, the game screen generation module 112 extracts all the support characters that are associated with the stage selected by the player.

Next, after extracting the support characters in this manner, the game screen generation module 112 generates the screen data (HTML data) of a game screen used for support character selection, providing these support characters in a list view (Step S103). The server device 10 then transmits screen data corresponding to the thus generated game screen used for support character selection to the requesting player terminal 20 over the network 2.

Next, when this screen data transmitted from the server device 10 is received, the player terminal 20, upon analyzing the screen data, displays the game screen (web page) used for support character selection illustrated in FIG. 14 on the terminal display module 24. Subsequently, when the game screen 50 used for support character selection is displayed, the player terminal 20 allows the player to perform selection operations using the control buttons 51, thereby specifying the desired support characters in the list (Step S104). Subsequently, when a selection operation is performed by the player using a particular control button 51, the player terminal 20 transmits a command (deck assembly request) to the server device 10, requesting that a battle deck to be used by the player in battle play be assembled based on such operational information.

Next, upon receiving the deck assembly request transmitted from the player terminal 20, the server device 10 carries out processing to assemble the player's battle deck (Step S105). Namely, the deck assembly processing module 111B refers to the player information illustrated in FIG. 6 and identifies the team information associated with the player. Subsequently, by referring to the team information illustrated in FIG. 9, the deck assembly processing module 111B selects a team having the initial team ID associated therewith (for example, "Team A") and assembles a battle deck by adding the support character specified by the player in the list in Step S104 to the constituent characters of that team.

Next, upon assembly of the battle deck in this manner, the server device 10 directs the game screen generation module 112 to generate screen data (an HTML file) used to display a start battle game screen (web page), which includes a display of this battle deck on the player terminal 20 (Step S106).

The server device 10 then transmits screen data corresponding to the thus generated start battle game screen to the requesting player terminal 20 over the network 2. Subsequently, upon receiving the screen data transmitted from the server device 10, the player terminal 20 analyzes the screen data and, as a result, displays the start battle game screen on the terminal display module 24.

FIG. 15 is a diagram illustrating an example of the start battle game screen 60. This start battle game screen 60 includes a battle deck display area 61, a control button 62 used to initiate a battle, and a control button 63 used to re-assemble the battle deck. The battle deck assembled by the deck assembly processing module 111B is displayed in the battle deck display area 61, thereby allowing the player to check the constituent characters of this battle deck. It should be noted that when the player enters a touch gesture in the battle deck display area 61, the team having the top team ID associated therewith (e.g., "Team A") may be replaced with a team having the next team ID associated therewith (e.g., "Team B") as the battle deck displayed on the screen. In other words, a second battle deck may be displayed in which the support character is added to the constituent characters of the team corresponding to the next team ID (e.g., "Team B"). In such a case, the player may engage in battle play using the second battle deck. The teams may of course be switched in succession whenever the player enters a touch gesture, thus displaying a second battle deck, a third battle deck, a fourth battle deck, and so forth, on the screen.

Next, going back to FIG. 13, the player terminal 20 determines whether or not the selection operation was performed by the player using the control button 62 when the start battle game screen 60 was displayed on the terminal display module 24 (Step S107). Then, if the selection operation is performed using the control button 63, and not the control button 62 (Step S107: NO), the player terminal 20 goes back to Step S104, and the subsequent processing is repeated. On the other hand, when the selection operation is performed using the control button 62 (Step S107: YES), the player terminal 20 transmits a command (battle initiation request) with a request to start battle play using the battle deck to the server device 10 via the terminal communication module 25.

Next, upon receiving the battle initiation request transmitted from the player terminal 20, the server device 10 carries out battle processing (Step S108). Specifically, the battle processing module 111C determines one or many enemy characters appearing in the stage that is specified by the player based on the rate of appearance of the appearing characters configured in the stage information illustrated in FIG. 5. Subsequently, the battle processing module 111C directs the player characters and the support character forming the player's battle deck to engage in battle with the enemy characters that were determined. Namely, along with acquiring various parameters configured in the player characters that constitute the battle deck (attack strength, defense strength, hit points, etc.) by referring to the team information illustrated in FIG. 9 and the proprietary character information illustrated in FIG. 7, as well as acquiring various parameters configured in the support character (attack strength, defense strength, hit points, etc.) by referring to the support character information illustrated in FIG. 10 and the proprietary character information illustrated in FIG. 7, the battle processing module 111C acquires various parameters configured in the enemy characters (upper attack strength limit, upper defense strength limit, upper hit point limit, etc.) by referring to the stage information illustrated in FIG. 5 and character information illustrated in FIG. 4. The battle processing module 111C then determines the winner of the battle based on the various parameters of these characters.

Next, when the battle process ends in this manner, the server device 10 determines whether or not the stage has been cleared (Step S109). Namely, the game progress module 111 determines that the player has cleared the stage if it is decided by the battle processing module 111C that the player has won. And if the player could not clear the stage (Step S109: NO), this process is terminated. On the other hand, if the player has cleared the stage (Step S109: YES), the cleared stages information illustrated in FIG. 11 is updated and, at the same time, game play in the next stage is authorized, and the process advances to Step S110.

A benefit provision process is executed in Step S110. Namely, the benefit provision processing module 111D awards the enemy character defeated by the player to said player as a benefit in accordance with a predetermined probability, and the proprietary character information illustrated in FIG. 7 is updated. In addition, the benefit provision processing module 111D awards the items belonging to this enemy character to the player as benefits in accordance with the drop rate of the enemy character defeated by the player (see FIG. 4), and the proprietary item information illustrated in FIG. 8 is updated. Furthermore, the benefit provision processing module 111D awards friend points as benefits to the friend player who owns the support character specified by the player (i.e., the support character constituting the battle deck), and the player information illustrated in FIG. 6 is updated.

Next, upon the player clearing the stage, the server device 10 executes a support character configuration process (Step S111).

Specifically, the support character configuration processing module 111E directs the game screen generation module 112 to generate a game screen for support character configuration used to configure the support character corresponding to the stage that has been cleared. The server device 10 then transmits screen data (HTML files) corresponding to this game screen to the requesting player terminal 20 over the network 2. Subsequently, upon receiving the screen data transmitted from the server device 10, the player terminal 20 analyzes the screen data and, as a result, displays the game screen used for support character configuration on the terminal display module 24.

FIG. 16 is a diagram illustrating an example of a game screen 70 used for support character configuration. This game screen 70 displays the name of the stage that has been cleared and its attributes, and, in addition, provides a list view of the player characters constituting the battle deck used when clearing the stage, as well as their attributes. By performing selection operations using the control buttons 71, the player configures a particular player character as a support character corresponding to this cleared stage. At such time, the player can configure a support character suitable for this stage by selecting a player character having advantageous attributes relative to the attributes configured for the stage and the attributes of the enemy characters that appear. For example, if "attribute A" is configured in the stage and "attribute B" is configured as an advantageous attribute relative to "attribute A", a support character suitable for this stage can be configured by selecting a player character having "attribute B". Accordingly, it becomes easier for other players to select a support character suitable for the stage used for battle play when selecting support characters. In addition, the player is likely to acquire more friend points because the likelihood of other players selecting a support character configured by said player increases. In addition, for the player, this creates a motivation to successively clear stages because as more stages are cleared, more support characters can be configured.

Subsequently, when a selection operation is performed by the player using a particular control button 71 while the game screen 70 used for support character configuration is displayed on the terminal display module 24, the player terminal 20 transmits a command (support character configuration request) requesting support character configuration based on this operational information to the server device 10.

Then, upon receiving the support character configuration request transmitted from the player terminal 20, the server device 10 configures a support character corresponding to the stage cleared by the player. Namely, the support character configuration processing module 111E configures and registers the support character selected by the player in association with the stage cleared by the player as the support character information illustrated in FIG. 10.

As described above, the game system 1 according to the present embodiment can direct the player to configure a stage-appropriate support character for each stage. For this reason, it becomes easy for the player engaged in battle play in the stage to select a support character suitable for this stage from a list and gain an advantage in the battle with enemy characters in the stage. Furthermore, it becomes easy for friend players to acquire more benefits because a support character likely to be selected by the player can be configured for each stage.

Other Embodiments

The foregoing embodiment was intended to facilitate the understanding of the present invention and is not to be construed as limiting of the present invention. The present invention can be modified and improved without departing from its spirit and the present invention includes equivalents thereto. In particular, the embodiments described below are also included in the present invention.
<Support Character Configuration Process>
Although the present embodiment has been described with reference to an example in which the support character corresponding to the stage is configured after the player engages in battle play in the stage, the present invention is not limited thereto. For example, the support character may be configured at any time. Specifically, in response to the player's operations, as illustrated in FIG. 17, the player terminal 20 displays a game screen 80 used for support character configuration on the terminal display module 24. This game screen 80 used for support character configuration displays a list of stages, with the stage name and attributes displayed for each stage. When the game screen 80 used for support character configuration is displayed on the terminal display module 24, the player can perform selection operations using the control buttons 81 to change and re-configure support characters for stages that have support characters already configured. In addition, the player can perform selection operations using the control buttons 82 to configure a support character selected from multiple characters owned by the player herself or himself for stages that don't have a support character configured yet. It should be noted that, for stages that don't have a support character configured yet, the player's team information (see FIG. 9) may be used such that a player character configured as the leader among the constituent characters of the team having the initial team ID associated therewith (e.g., "Team A") is automatically configured as a support character and this support character is displayed on the game screen 80 used for support character configuration. Alternatively, the player character configured as the leader of the team constituting the battle deck used by the player during battle play in the cleared stage may be automatically configured as a support character and this support character may be displayed on screen.

Although the present embodiment has been described above with reference to a case in which a single support character is configured for a single stage, the present invention is not limited thereto. For example, two or more support characters may be configured for a single stage in advance and the player engaged in battle play in the stage may be allowed to select any support characters from the multiple support characters. Specifically, the support character configuration processing module 111E configures and registers the multiple support characters selected by the player in association with the stage as the support characters illustrated in FIG. 10. In addition, for example, when two or more support characters are configured for a certain stage that has been cleared, the player may be allowed to select at least one or more player characters from the battle deck used by the player during battle play in the cleared stage and configure it as a support character corresponding to the stage and, at the same time, the player's team information (see FIG. 9) may be used such that the player character configured as the leader among the constituent characters of the team having the initial team ID (e.g., "Team A") associated therewith is configured as a support character. At such time, if the team constituting the battle deck used by the player during battle play and the team having the initial team ID associated therewith are the same team, the player character configured as the leader among the constituent characters of the team having the next team ID associated therewith may be configured as a support character.

In the present embodiment as described above, the player may be allowed to configure a support character corresponding to a friend player (another player). Specifically, the support character configuration processing module 111E configures and registers support characters selected by the player for each friend player as the support character information illustrated in FIG. 10 in association with the stages where the player can engage in battle play. It should be noted that, at such time, the game progress module 111 may use the cleared stages information (see FIG. 11) of each friend player to identify the stages that the friend player has not cleared yet and direct the game screen generation module 112 to generate a game screen used for providing information about these stages to thereby notify the player of such information. Here, the number of times the player has failed to clear the stage as well as the period of time the player has been unable to clear the stage may be recorded for each stage in the cleared stages information. In such a case, the game progress module 111 may use this cleared stages information to identify stages that the friend player has failed to clear at least a predetermined number of times, or stages that the friend player has been unable to clear for at least a predetermined period of time, and notify the player of information relating to these stages. It should be noted that the stage-related information communicated to the player may include the number of times the friend player has failed to clear the stage and the period of time the player has been unable to clear the stage. In this manner, as a result of being notified, the player can configure support characters corresponding to the stages that have not yet been cleared for each friend player.

In the present embodiment as described above, support characters may be configured depending on the level of the friend player (another player). For example, if the level of the friend player is 21-30, Character A may be configured as a support character, and if the level is 31-40, Character B may be configured as a support character.

Although the present embodiment has been described above with reference to a case in which a player character is selected by the player on the game screen 70 used for support character configuration from a battle deck used by the player during battle play in a cleared stage, as illustrated in FIG. 16, and the player character is configured as a support character corresponding to that stage, the present invention is not limited thereto. For example, a player character selected from proprietary characters may be configured as the support character corresponding to the cleared stage.

Although the present embodiment has been described above with reference to a case in which, upon clearing a stage, the player can configure a support character corresponding to that cleared stage, the present invention is not limited thereto. For example, even if the stage could not be cleared, a support character corresponding to that stage may still be configured.

<List View of Support Characters>

Although the present embodiment has been described above with reference to a case in which a list view of support characters, which are configured by friend players associated with a player engaged in battle play in a stage, is provided on the game screen used for support character selection illustrated in FIG. 14, the present invention is not limited thereto. For example, a support character configured by a player other than the friend players may be included in the list.

<Server Device>

Although the present embodiment has been described above with reference to a game system 1 equipped with a single server device 10 as an example of a service device, the invention is not limited thereto and a game system 1 equipped with multiple server devices 10, as an example of server devices, may also be used. In other words, multiple server devices 10 may be connected over a network 2 and these server devices 10 may perform various types of processing in a distributed manner. It should be noted that the server device is an example of a computer.

<Information Processing Device>

In the game system 1 used in the present embodiment as described above, the explanations are given with reference to a case in which various types of information processing are carried out by directing the server device 10 and the player terminals 20 to cooperate based on a game program (e.g., a non-transitory computer readable medium having machine-executable instructions and including a computer having a storage and a hardware processor). The invention, however, is not limited thereto and the above-mentioned various types of information processing may be carried out based on the game program using the server device 10 alone or the player terminals 20 alone as information processing devices.

In addition, a configuration may be used in which the player terminals 20 support part of the information processing device functionality. In such a case, the server device 10 and player terminals 20 constitute an information processing device.

It should be noted that the information processing device is an example of a computer equipped with a processor and a memory.

DESCRIPTION OF THE REFERENCE NUMERALS 1 game system
2 network
10 server device
11 control module
12 data storage module
13 input module
14 display module
15 communication module
20 player terminal
21 terminal control module
22 terminal storage module
23 terminal input module
24 terminal display module
25 terminal communication module
50 game screen
51 control button
60 game screen
61 battle deck display area
62 control button
63 control button
70 game screen
71 control button
80 game screen
81 control button
82 control button
111 game progress module
111A lottery processing module
111B deck assembly processing module
111C battle processing module
111D benefit provision processing module
111E support character configuration processing module
112 game screen generation module

The invention claimed is:
1. An information processing device, wherein said device is provided with
   a support character configuration processing module that configures, in association with a stage where each of a plurality of players can engage in battle play, a player character selected by each of the players from a plurality of characters owned by the players themselves as a support character that provides support in a stage where another player engages in battle play;

a game screen generation module which, once a first player among the plurality of players performs an operation to select a stage for battle play, generates a game screen displaying a list view of support characters associated with the selected stage;

a battle processing module which, once the first player performs an operation to select a particular support character from the list, directs the selected support character and a player character belonging to the first player to engage in battle with an enemy character configured in the selected stage; and a benefit provision processing module that provides benefits to a second player, from among the plurality of players, who owns the selected support character, and, after the first player completes battle play in the selected stage, the support character configuration processing module retains the player character belonging to the first player as a support character associated with said selected stage, and present the player character belonging to the first character as a selectable support character for the selected stage for subsequent selection of the selected stage.

2. An information processing device, wherein said device is provided with a support character configuration processing module that configures, in association with a stage where each of a plurality of players can engage in battle play, a player character selected by each of the players from a plurality of characters owned by the players themselves as a support character that provides support in a stage where another player engages in battle play;

a game screen generation module which, once a first player among the plurality of players performs an operation to select a stage for battle play, generates a game screen displaying a list view of support characters associated with the selected stage;

a battle processing module which, once the first player performs an operation to select a particular support character from the list, directs the selected support character and a player character belonging to the first player to engage in battle with an enemy character configured in the selected stage; and a benefit provision processing module that provides benefits to a second player, from among the plurality of players, who owns the selected support character, and, the support character configuration processing module retains the player character that is directed to engage in battle with the enemy character in the selected stage, from among the multiple characters owned by the first player, as a support character associated with said selected stage, and present the player character that is directed to engage in battle with the enemy character in the selected stage as a selectable support character for the selected stage for subsequent selection of the selected stage.

3. An information processing device, wherein said device is provided with a support character configuration processing module that configures, in association with a stage where each of a plurality of players can engage in battle play, a player character selected by each of the players from a plurality of characters owned by the players themselves as a support character that provides support in a stage where another player engages in battle play;

a game screen generation module which, once a first player among the plurality of players performs an operation to select a stage for battle play, generates a game screen displaying a list view of support characters associated with the selected stage;

a battle processing module which, once the first player performs an operation to select a particular support character from the list, directs the selected support character and a player character belonging to the first player to engage in battle with an enemy character configured in the selected stage; and a benefit provision processing module that provides benefits to a second player, from among the plurality of players, who owns the selected support character, and, the support character configuration processing module retains, in association with the selected stage where each of the plurality of players can engage in battle play, the support character corresponding to each of the other players engaged in battle play in the selected stage, and present the support character corresponding to each of the other players engaged in the battle play in the selected stage as a selectable support character for the selected stage for subsequent selection of the selected stage for the corresponding each of the other players engaged in battle play.

4. A non-transitory computer readable medium having machine-executable instructions and including a computer having a storage and a hardware processor, wherein said instructions direct the computer to perform:

a support character configuration process that configures, in association with a stage where each of a plurality of players can engage in battle play, a player character selected by each of the players from a plurality of characters owned by the players themselves as a support character that provides support in a stage where another player engages in battle play;

a game screen generation process which, once a first player among the plurality of players performs an operation to select a stage for battle play, generates a game screen displaying a list view of support characters associated with the selected stage;

a battle process which, once the first player performs an operation to select a particular support character from the list, directs the selected support character and a player character belonging to the first player to engage in battle with an enemy character configured in the selected stage;

a benefit provision process that provides benefits to a second player, from among the plurality of players, who owns the selected support character; and, during the support character configuration process, after the first player completes battle play in the selected stage, retains the player character belonging to the first player as a support character associated with said selected stage, and present the player character belonging to the first character as a selectable support character for the selected stage for subsequent selection of the selected stage.

5. A non-transitory computer readable medium having machine-executable instructions and including a computer having a storage and a hardware processor, wherein said instructions direct the computer to perform:

a support character configuration process that configures, in association with a stage where each of a plurality of players can engage in battle play, a player character selected by each of the players from a plurality of characters owned by the players themselves as a support character that provides support in a stage where another player engages in battle play;
a game screen generation process which, once a first player among the plurality of players performs an operation to select a stage for battle play, generates a game screen displaying a list view of support characters associated with the selected stage;
a battle process which, once the first player performs an operation to select a particular support character from the list, directs the selected support character and a player character belonging to the first player to engage in battle with an enemy character configured in the selected stage;
a benefit provision process that provides benefits to a second player, from among the plurality of players, who owns the selected support character; and,
during the support character configuration process, retains the player character that is directed to engage in battle with the enemy character in the selected stage, from among the multiple characters owned by the first player, as a support character associated with said selected stage, and present the player character that is directed to engage in battle with the enemy character in the selected stage as a selectable support character for the selected stage for subsequent selection of the selected stage.

6. A non-transitory computer readable medium having machine-executable instructions and including a computer having a storage and a hardware processor, wherein said instructions direct the computer to perform:
a support character configuration process that configures, in association with a stage where each of a plurality of players can engage in battle play, a player character selected by each of the players from a plurality of characters owned by the players themselves as a support character that provides support in a stage where another player engages in battle play;
a game screen generation process which, once a first player among the plurality of players performs an operation to select a stage for battle play, generates a game screen displaying a list view of support characters associated with the selected stage;
a battle process which, once the first player performs an operation to select a particular support character from the list, directs the selected support character and a player character belonging to the first player to engage in battle with an enemy character configured in the selected stage;
a benefit provision process that provides benefits to a second player, from among the plurality of players, who owns the selected support character; and,
during the support character configuration process, retains, in association with the selected stage where each of the plurality of players can engage in battle play, the support character corresponding to each of the other players engaged in battle play in the selected stage and present the support character corresponding to each of the other players engaged in the battle play in the selected stage as a selectable support character for the selected stage for subsequent selection of the selected stage for the corresponding each of the other players engaged in battle play.

* * * * *